(12) United States Patent
Kim (10) Patent No.: US 7,512,331 B2
(45) Date of Patent: Mar. 31, 2009

(54) APPARATUS FOR DRIVING LENS IN CAMERA

(75) Inventor: Hee Cheol Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 11/442,397

(22) Filed: May 30, 2006

(65) Prior Publication Data
US 2006/0280493 A1    Dec. 14, 2006

(30) Foreign Application Priority Data
May 30, 2005    (KR) ...................... 10-2005-0045575

(51) Int. Cl.
*G03B 3/10* (2006.01)
(52) U.S. Cl. ...................... 396/133; 396/248; 359/823; 359/824
(58) Field of Classification Search ................. 396/248, 396/133; 359/823, 824
See application file for complete search history.

(56) References Cited

U.S. PATENT DOCUMENTS

| | | | | |
|---|---|---|---|---|
| 2005/0067921 A1* | 3/2005 | Yamamoto | ................. | 310/317 |
| 2005/0242685 A1* | 11/2005 | Yuasa | .......................... | 310/317 |
| 2006/0076853 A1* | 4/2006 | Weaver et al. | ............... | 310/317 |
| 2006/0113865 A1* | 6/2006 | Yoshida | ...................... | 310/317 |
| 2006/0186758 A1* | 8/2006 | Yuasa et al. | .................. | 310/317 |

FOREIGN PATENT DOCUMENTS

KR    10-2006-0061243 A    6/2006

* cited by examiner

*Primary Examiner*—W. B. Perkey
*Assistant Examiner*—Warren K Fenwick
(74) *Attorney, Agent, or Firm*—Birch, Stewart, Kolasch & Birch, LLP (57) ABSTRACT

An apparatus for driving lens in a camera is disclosed, by which an auto-focusing and/or zooming function is supported using a piezoelectric element and by which an auto-focusing and/or zooming function can be supported with advantageous price, power consumption and device volume. The present invention includes a lens drive unit moving the lens in one direction according to a current direction, a control circuit unit switching the current direction to move the lens, and a control unit supplying a control signal for switching the current direction to the control circuit unit.

16 Claims, 6 Drawing Sheets

—— Forward direction
------ Reverse direction ved in 
APPARATUS FOR DRIVING LENS IN CAMERA This application claims the benefit of the Korean Patent Application No. 10-2005-0045575, filed on May 30, 2005, which is hereby incorporated by reference as if fully set forth herein.

BACKGROUND OF THE INVENTION

1. Field of the Invention

The present invention relates to a camera, and more particularly, to an apparatus for driving lens in a camera. Although the present invention is suitable for a wide scope of applications, it is particularly suitable for supporting an auto-focus and zoom of the camera.

2. Discussion of the Related Art

Generally, a digital camera such as a normal digital camera, a digital camera provided to a mobile terminal and a latest digital camera and the like is equipped with an auto-focusing function and/or a zooming function.

For the auto-focus or zoom, the camera is provided with a step motor, a voice coil motor or the like.

So, the auto-focusing or zooming function of the camera can be implemented in various ways such as a step motor driving system, a voice coil motor driving system and the like.

Figure 1:
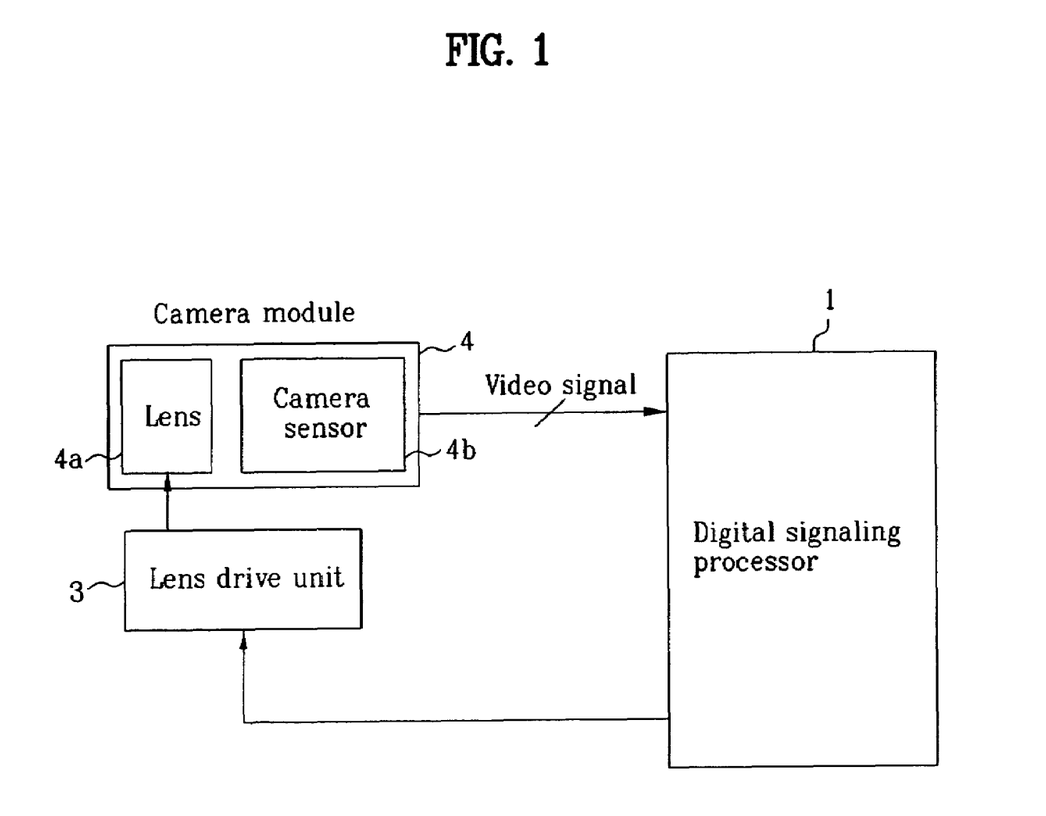
FIG. 1 is a block diagram of a camera lens drive according to a related art.

FIG. 1 is a block diagram of a camera lens drive according to a related art.

Referring to FIG. 1, a lens drive according to a related art consists of a digital signaling processor 1, a lens drive unit 3 and a camera module 4.

The camera module 4 consists of a lens 4a and a camera sensor 4b.

The lens drive unit 3 moves the lens 4a of the camera module 4 according to a control of the digital signaling processor 1.

The digital signaling processor 1 controls the lens drive unit 3.

The control of the lens drive unit 3 by the digital signaling processor 1 is based on a video signal inputted from the camera module 4. And, the lens drive unit 3 is controlled according to a users manipulation of the camera.

The step or voice coil motor drive system is generally applied to the lens drive unit 3.

The step motor drive system facilitates a drive control and enables a fine adjustment in performing the auto-focusing and/or zooming function. Yet, at least two motors are needed to perform the auto-focusing and/or zooming function in general. So, a product cost rise is inevitable, an overall device volume increases, and power consumption is raised.

And, the voice coil motor drive system is relatively cheaper than other drive systems. Yet, the voice coil drive system facilitates the implementation of the auto-focusing function only but has difficulty in implementing the optical zooming function.

Hence, the demand for a further developed device for the auto-focusing and/or zooming function rises.

SUMMARY OF THE INVENTION

Accordingly, the present invention is directed to an apparatus for driving lens in a camera that substantially obviates one or more problems due to limitations and disadvantages of the related art.

An object of the present invention is to provide an apparatus for driving lens in a camera, by which an auto-focusing and/or zooming function is supported using a piezoelectric element.

Another object of the present invention is to provide an apparatus for driving lens in a camera, by which an auto-focusing and/or zooming function can be supported with advantageous price, power consumption and device volume.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a lens in a camera according to the present invention includes a lens drive unit moving the lens in one direction according to a voltage and/or a current, a control circuit unit adjusting the voltage and/or the current to move the lens, and a control unit supplying a control signal for controlling the adjustment of the voltage and/or the current to the control circuit unit.

Preferably, the lens drive unit includes a piezoelectric element to move the lens in either a front direction or a rear direction according to a direction of a current flowing between both ends of the piezoelectric element.

Preferably, the control signal is generated for auto-focusing and optical zooming based on an input video.

Preferably, the control circuit unit includes an H-bridge circuit switching a current direction to move the lens according to the control signal.

More preferably, the H-bridge circuit includes a plurality of field effect transistors.

More preferably, the H-bridge circuit includes a plurality of bipolar junction transistors.

In another aspect of the present invention, an apparatus for driving a lens in a camera includes a piezo-actuator having a piezoelectric element to drive the lens, a micro-controller generating a voltage needed to rive the piezoelectric element, and a control circuit adjusting a voltage applied to both ends of the piezoelectric element from the voltage generated from the micro-controller.

Preferably, the micro-controller generates the voltage needed to drive at least one of auto-focusing and optical zooming.

Preferably, the piezo-actuator drives the lens to move in either a forward direction or a reverse direction according to a direction of the voltage applied to both of the ends of the piezoelectric element.

Preferably, the apparatus further includes a digital signaling processor outputting a lens adjustment value to the micro-controller to generate the voltage needed to derive the piezoelectric element, the digital signaling processor computing the lens adjustment value based on a video inputted via the lens.

Preferably, the apparatus further includes a level shifter between the micro-controller and the control circuit, in order to compensate for a difference between the voltage generated from the micro-controller and an operational voltage necessary for the piezoelectric element to drive the lens.

Preferably, the apparatus further includes a pull-up resistor between the micro-controller and the control circuit, in order to compensate for a difference between the voltage generated from the micro-controller and an operational voltage necessary for the piezoelectric element to drive the lens.

Preferably, the control circuit includes a plurality of field effect transistors.

More preferably, a plurality of the field effect transistors includes a first field effect transistor having a gate connected to a first output end of the micro-controller, the first field effect transistor having a source connected to a supply voltage, the first field effect transistor having a drain connected to a first end of the piezoelectric element, a second field effect transistor having a gate connected to a second output end of the micro-controller, the second field effect transistor having a source connected to the supply voltage, the second field effect transistor having a drain connected to a second end of the piezoelectric element, a third field effect transistor having a gate connected to a third output end of the micro-controller, the third field effect transistor having a source connected to a ground (GND), the third field effect transistor having a drain connected to the drain of the first field effect transistor and the first end of the piezoelectric element, and a fourth field effect transistor having a gate connected to a fourth output end of the micro-controller, the fourth field effect transistor having a source connected to the ground (GND), the fourth field effect transistor having a drain connected to the drain of the second field effect transistor and the second end of the piezoelectric element.

More preferably, the control circuit further includes a first charge capacitor connected between the first end of the piezoelectric element and the ground and a second charge capacitor connected between the second end of the piezoelectric element and the ground.

More preferably, a plurality of the field effect transistors further includes a fifth field effect transistor having a gate connected to the first output end of the micro-controller, the fifth field effect transistor having a source connected to the ground, the fifth field effect transistor having a drain connected to a ground side end of the first charge capacitor and a sixth field effect transistor having a gate connected to the second output end of the micro-controller, the sixth field effect transistor having a source connected to the ground, the sixth field effect transistor having a drain connected to a ground side end of the second charge capacitor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
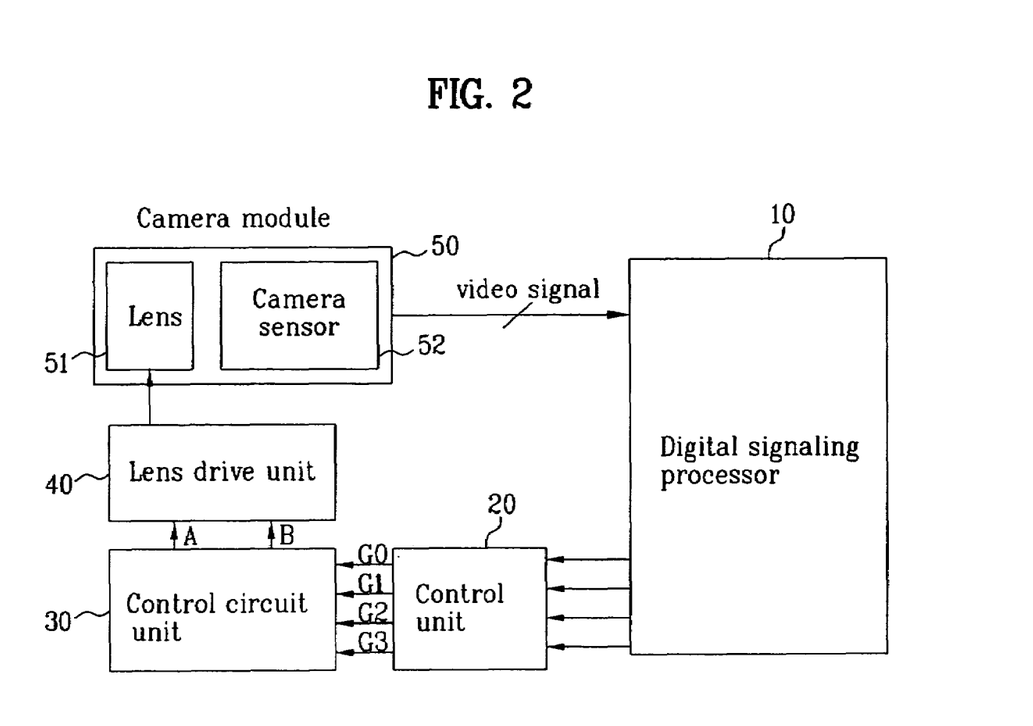
FIG. 2 is a block diagram of an apparatus for driving a lens in a camera according to one embodiment of the present invention.

FIG. 2 is a block diagram of an apparatus for driving a lens in a camera according to one embodiment of the present invention.

Referring to FIG. 2, an apparatus for driving a lens in a camera according to one embodiment of the present invention includes a digital signaling processor (DSP) 10, a control unit 20, a control circuit unit 30, a lens drive unit 40 and a camera unit 50.

The control circuit unit 30 takes charge of switching to turn on/off the lens drive unit 40 and includes H-bridge circuit for example.

The camera module 50 includes a lens 51 and a camera sensor 52.

The lens drive unit 40 plays a role in moving the lens 51 of the camera module 50. And, the lens drive unit 40 driving the lens 51 includes a piezo-actuator employing a piezoelectric element. So, an example of driving the lens using the piezo-actuator is explained in the following description.

The digital signaling processor 10 executes auto-focusing algorithm based on a video signal inputted from the camera module 50.

The digital signaling processor 10 outputs a result of the auto-focusing algorithm execution, i.e., a control signal for an auto-focusing drive to the control unit 20. In particular, the digital signaling processor 10 computes an adjustment value of the inputted video signal to set a focus on a fixed photographing surface automatically using the auto-focusing algorithm and then outputs the computed value to the control unit 20.

And, the camera sensor 52 of the camera module 50 includes a CCD (charge coupled device) sensor or a CMOS (complementary metal oxide semiconductor) sensor. Moreover, the lens 51 supports both auto-focusing (AF) and optical zooming. And, the digital zoom is processed by the digital signaling processor 10.

The control unit 20 preferably includes a micro-controller. The control unit 20 generates a control signal for the auto-focusing and zooming drive using the control signal (adjustment value) of the digital signaling processor 10. In this case, the control signal is a drive voltage pulse for a drive of the lens 51. And, the generated control signal is outputted to the control circuit unit 30.

And, the control unit 20 outputs the control signal for the auto-focusing and zooming drive to the control circuit unit 30 if a user manipulates various functional buttons associated with a shutter or photographing. For instance, the functional buttons include a zoom-in button, a zoom-out button and the like.

The control circuit unit 30 switches a voltage to be supplied to the lens drive unit 40 according to the control signal of the control unit 20. In this case, the switching of the voltage has the same meaning of a switching of a current direction. So, it is the same meaning of applying the voltage between both ends. In the following description, it is mainly explained that a polarity (+ or −) of the voltage applied between both ends is switched. And, a switching of the current direction is explained as well.

Figure 3:
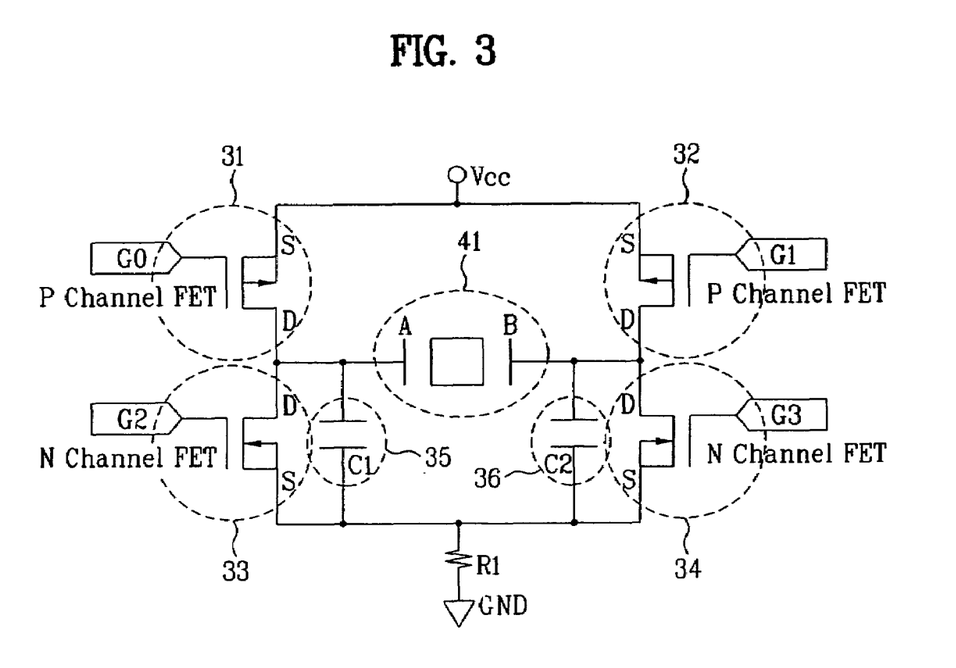
FIG. 3 is a detailed circuit diagram of a control circuit for a lens drive according to one embodiment of the present invention.
Figure 7:
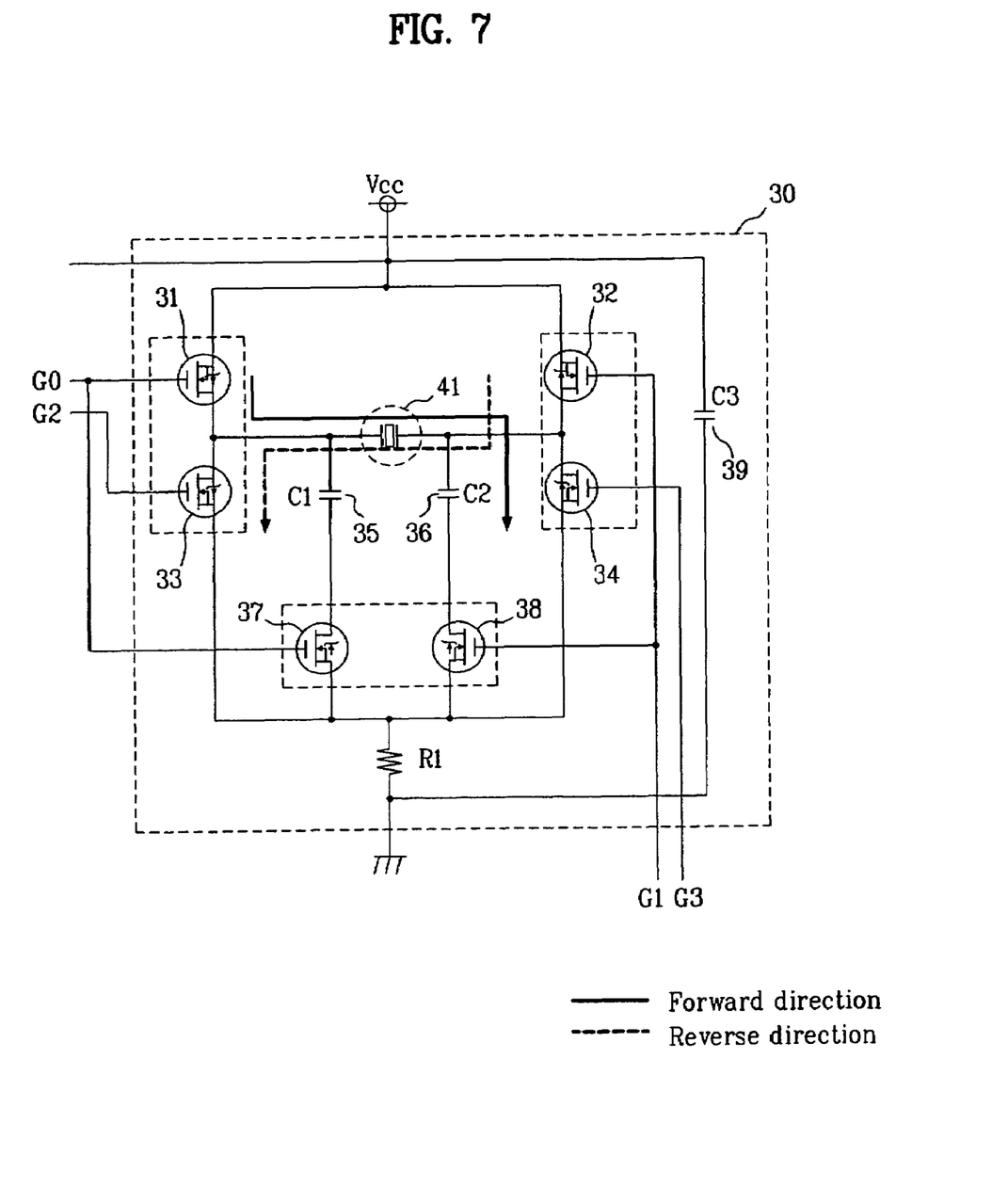
FIG. 7 is a detailed circuit diagram of a control circuit for a lens drive according to another embodiment of the present invention.

Specifically, the control circuit unit 30, as shown in FIG. 3 or FIG. 7, uses a plurality of switching devices.

FIG. 3 shows an example of using four field effect transistors (FETs). And, FIG. 7 shows an example of using six field effect transistors (FETs). The number of the FETs in FIG. 7 is greater than that in FIG. 3. Yet, the configuration shown in FIG. 7 has power consumption less than that shown in FIG. 3. So, the configuration shown in FIG. 7 or FIG. 3 is selectively taken into consideration for implementation.

Alternatively, the FET can be preferably replaced by BJT (bipolar junction transistor) for the control circuit unit 30.

In case of using FETs for the control circuit unit 30, the control unit 20 regulates a gate voltage or current of each of the FETs.

On the other hand, in case of using BJTs for the control circuit unit 30, the control unit 20 regulates a base voltage or current of each of the BJTs.

In the following description, an example of using FETs for the control circuit unit 30 is explained.

The lens drive unit 40 moves the lens 51 of the camera module 50 according to the switching of the control circuit unit 30. The lens drive unit 40 is provided with a piezoelectric element. The lens 51 is moved in a forward or reverse direction according to (or, current direction) applied between both ends A and B of the piezoelectric element. IN particular, if a direction of a current flowing between both ends of the piezoelectric element corresponds to a forward direction, the lens 51 is moved in a front direction. If a direction of a current flowing between both ends of the piezoelectric element corresponds to a reverse direction, the lens 51 is moved in a rear direction.

Both of the ends A and B of the piezoelectric element are connected to drains of the FETs provided to the control circuit unit 30. The connection relation is shown in detail in FIG. 3 or FIG. 7.

The control unit 20 outputs control signals for adjusting the gate voltages or currents of the FETs provided to the control circuit unit 30, respectively. By the control signals outputted from the control unit 20, drain voltages or currents of the FETs are varied to change the voltage applied between both of the ends A and B of the piezoelectric element.

The control circuit unit 30 according to the present invention is explained in detail as follows.

FIG. 3 is a detailed circuit diagram of a control circuit for a lens drive according to one embodiment of the present invention, in which H-bridge circuit is shown.

Referring to FIG. 3, the control circuit unit 30 includes four field effect transistors (FETs) 31 to 34. And, the control circuit unit 30 further includes charge capacitors (C1 and C2) 35 and 36 to sustain a predetermined level of a voltage applied between both ends A and B of a piezoelectric element 41 according to outputs of the control unit 20, i.e., voltages of gates G0 to G3 applied to the gates of the FETs 31 to 34, respectively.

The first and second FETs 31 and 32 has P-channels, whereas the third and fourth FETs 33 and 34 have N-channels.

The gate G0 of the first P-channel FET 31 is connected to one output end of the control unit 20 and a source (S) of the first P-channel FET 31 is connected to a supply voltage Vcc. And, a drain (D) of the first P-channel FET 31 is connected to a drain (D) of the third N-channel FET 33 and one end of the piezoelectric element 41.

The gate G1 of the second P-channel FET 32 is connected to the other output end of the control unit 20, a source (S) of the second P-channel FET 32 is connected to the supply voltage Vcc together with the source of the first FET 31, and a drain (D) the second P-channel FET 32 is connected to a drain (D) of the fourth N-channel FET 34.

The gate G2 of the third N-channel FET 33 is connected to the other output end of the control unit, a source (S) of the third N-channel FET 33 is connected to a ground (GND), and a drain (D) of the third N-channel FET 33 is connected to the drain (D) of the first P-channel FET 31 and one end of the piezoelectric element 41 connected to the drain (D) of the first FET 31.

The gate G3 of the fourth N-channel FET 34 is connected to the other output end of the control unit 20, a source (S) of the fourth N-channel FET 34 is connected to the ground (GND) together with the source of the third FET 33, and the drain (D) of the fourth N-channel FET 34 is connected to the drain (D) of the second FET 32.

One end (A) of the piezoelectric element 41 is connected parallel to the drain connection between the first and third FETs 31 and 33, while the other end (B) of the piezoelectric element 41 is connected parallel to the drain connection between the second and fourth FETs 32 and 34.

The charge capacitor (C1) 35 is connected between one end (A) of the piezoelectric element 41 and the ground (GND), while the other charge capacitor (C2) 36 is connected between the other end (B) of the piezoelectric element 41 and the ground (GND). And, a ground resistor R1 is connected to the ground (GND).

Figure 4:
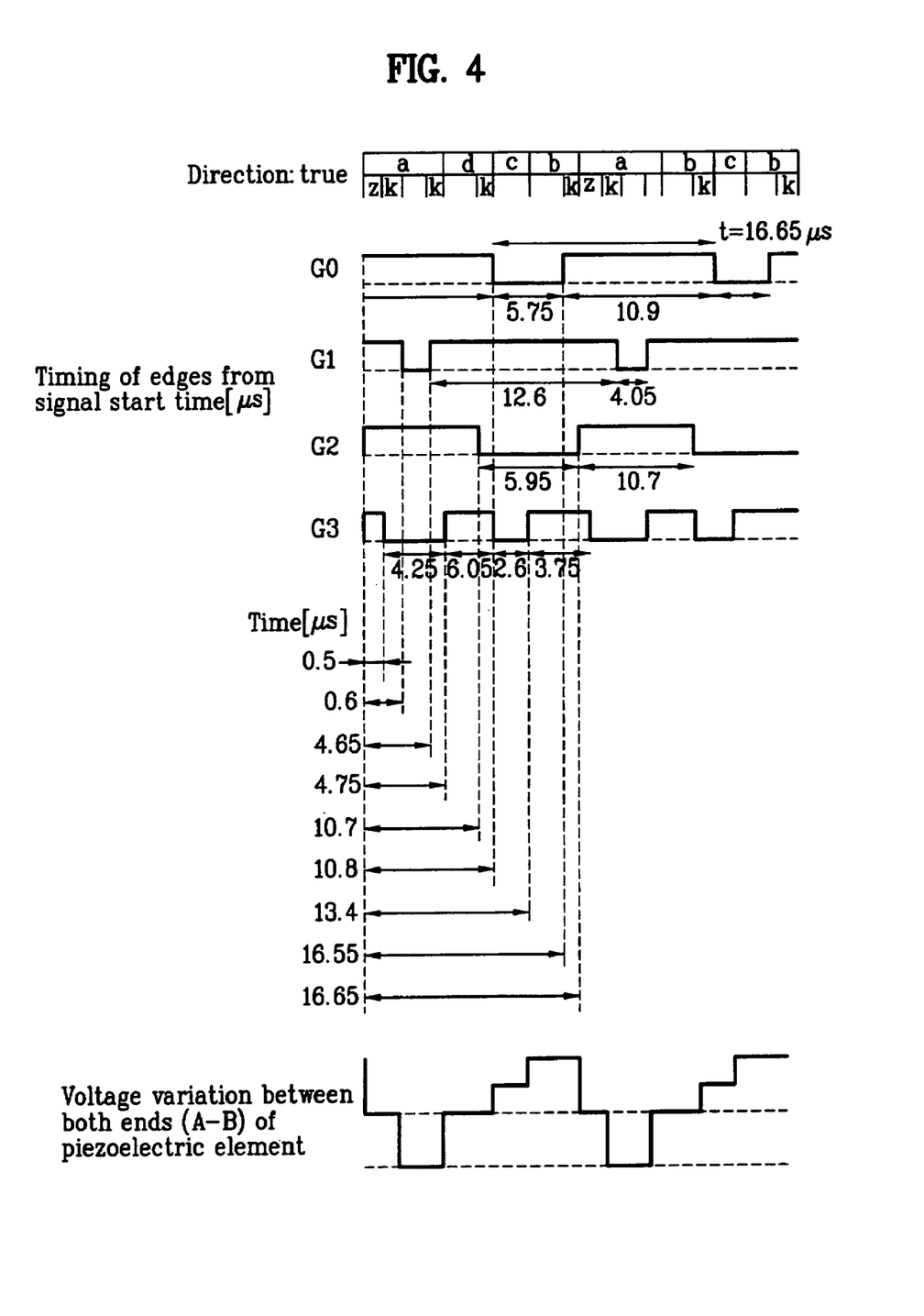
FIG. 4 is a timing diagram of a forward lens drive according to a circuit configuration shown in FIG. 3.

FIG. 4 is a timing diagram of a forward lens drive according to a circuit configuration shown in FIG. 3, in which the lens 51 is driven in a forward direction by a voltage applied between both ends A and B of the piezoelectric element 41.

Referring to FIG. 4, the control unit 20 applies control signals (drive voltage pulses) to the gates G0 to G3 of the FETs 31 to 34 to drive the lens 51, respectively.

As a voltage applied between both ends A and B of the piezoelectric element is varied by a difference between the drive voltage pulse applied to the gates of a pair of the FETs 31 and 33 at the end-A and the drive voltage pulse applied to the gates of a pair of the FETs 32 and 34 at the end-B, the voltage variation between both of the ends A and B rises so that a current can flow to the end-B from the end-A.

Figure 5:
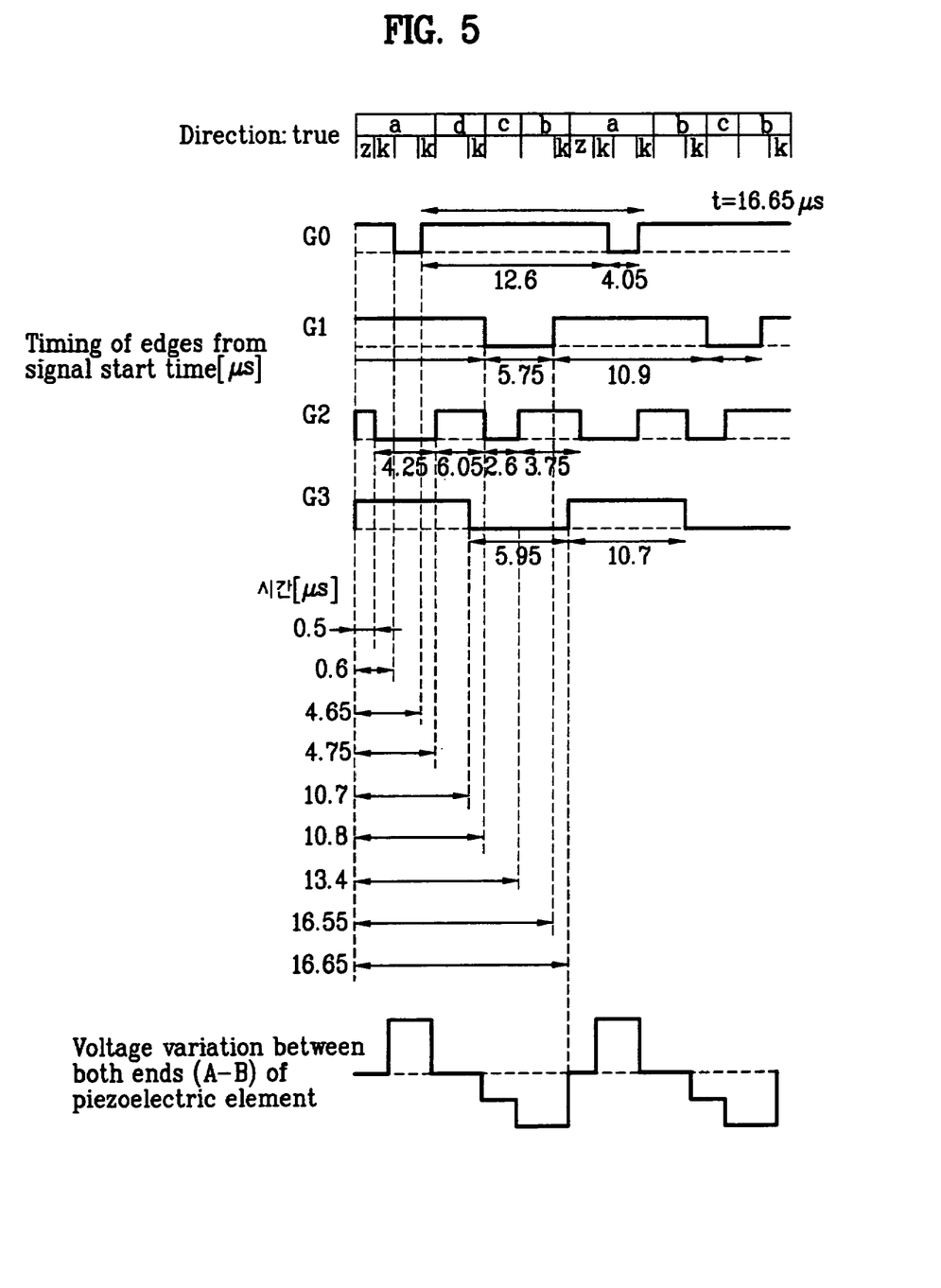
FIG. 5 is a timing diagram of a reverse lens drive according to a circuit configuration shown in FIG. 3.

FIG. 5 is a timing diagram of a reverse lens drive according to a circuit configuration shown in FIG. 3, in which the lens 51 is driven in a reverse direction by a voltage applied between both ends A and B of the piezoelectric element 41.

Referring to FIG. 5, the control unit 20 applies control signals (drive voltage pulses) to the gates G0 to G3 of the FETs 31 to 34 to drive the lens 51, respectively.

As a voltage applied between both ends A and B of the piezoelectric element is varied by a difference between the drive voltage pulse applied to the gates of a pair of the FETs 31 and 33 at the end-A and the drive voltage pulse applied to the gates of a pair of the FETs 32 and 34 at the end-B, the voltage variation between both of the ends A and B falls so that a current can flow to the end-A from the end-B.

The timing shown in FIG. 4 or FIG. 5 can vary according to the piezo-characteristics and the lens 51. And, a level of the voltage applied between both of the ends A and B of the piezoelectric element 41 is diversified according to an adopted application up to 2.8~30V.

Figure 6A:
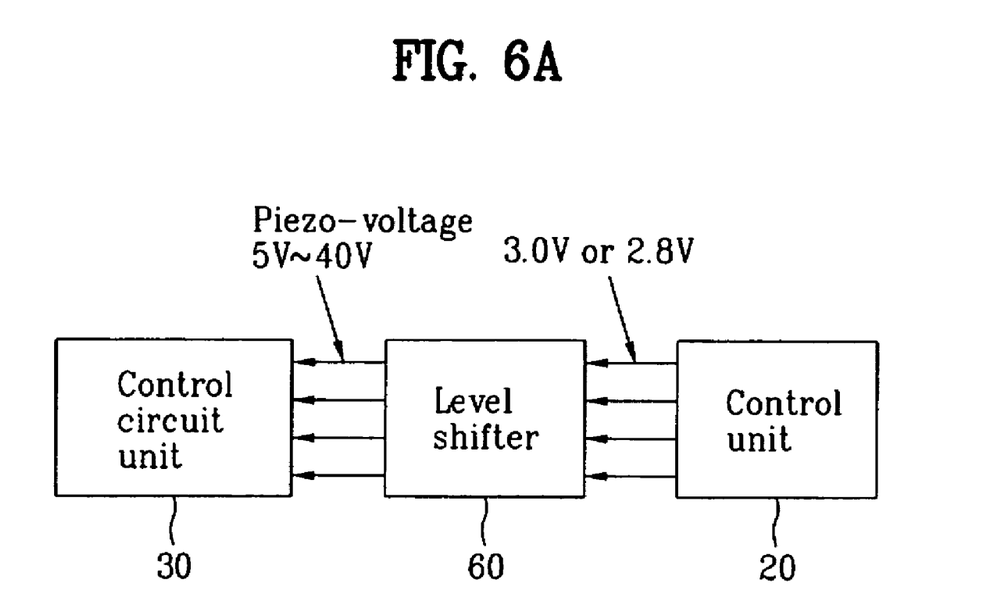
FIG. 6A is a block diagram of an apparatus for driving a lens in a camera according to another embodiment of the present invention, in which a level shifter is used.
Figure 6B:
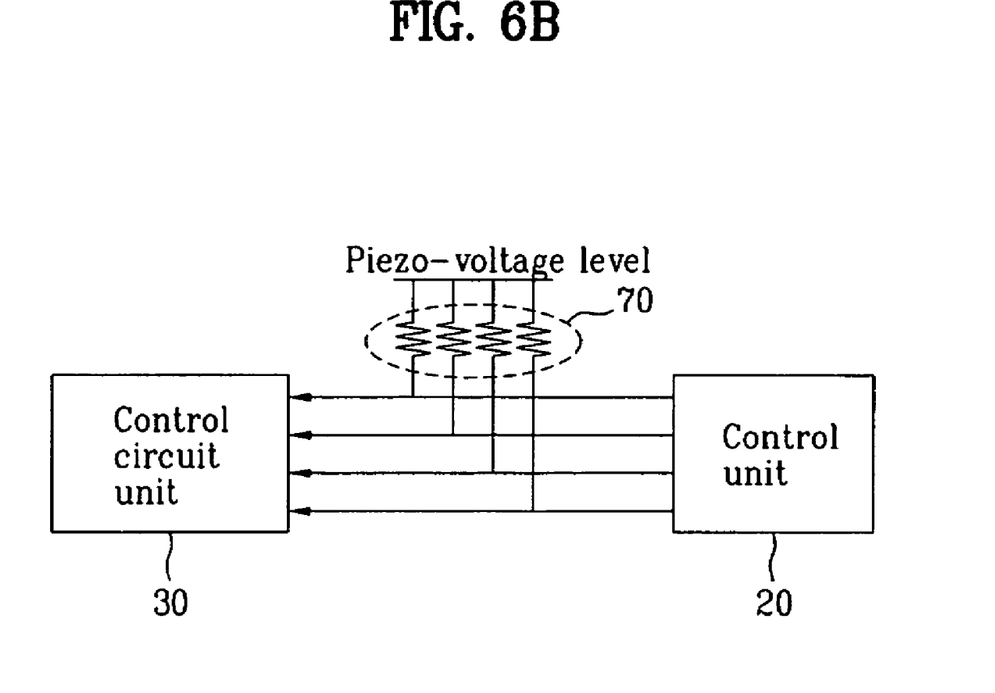
FIG. 6B is a block diagram of an apparatus for driving a lens in a camera according to another embodiment of the present invention, in which a pull-up resistor is used.

To prepare for a difference between an output voltage of the control unit 20 and an operational voltage of the piezoelectric element 41 for the piezo-lens drive, a level shifter 60 or a pull-up resistor 70, as shown in FIG. 6A and FIG. 6B, respectively, is further provided to an interface between the control unit 20 and the control circuit unit 30.

Namely, the level shifter 60 or the pull-up resistor 70 is provided to compensate for the difference between the output voltage of the control unit 20 and the operational voltage of the piezoelectric element 41 for the piezo-lens drive.

In particular, the level shifter 60 or the pull-up resistor 70 compensates for the difference between the voltage generated by the control unit 20 to drive the piezoelectric element 41 and the operational voltage necessary for the piezoelectric element 41 to drive the lens.

FIG. 6A is a block diagram of an apparatus for driving a lens in a camera according to another embodiment of the present invention, in which a level shifter is used. And, FIG. 6B is a block diagram of an apparatus for driving a lens in a camera according to another embodiment of the present invention, in which a pull-up resistor is used.

In case of using pull-up resistors, as shown in FIG. 6B, an input/output pin of the control unit 20 is an open drain type.

A level shifter, as shown in FIG. 6A, changes an output voltage of the control unit 20 into an operational voltage (e.g., 5V to 40V) for a piezo-lens drive if the output voltage of the control unit 20 is 3.0V or 2.8V.

The pull-up resistor, as shown in FIG. 6B, supplies the operational voltage for the piezo-lens drive to the control circuit unit 30.

FIG. 7 is a detailed circuit diagram of a control circuit for a lens drive according to another embodiment of the present invention, in which H-bridge circuit is shown for example.

Referring to FIG. 7, the control circuit unit 30 includes four field effect transistors (FETs) 31 to 34 for the piezo-lens drive and two FETs 37 and 38 for power reduction in the piezo-lens drive.

And, the control circuit unit 30 further includes charge capacitors (C1 and C2) 35 and 36 to sustain a predetermined level of a voltage applied between both ends A and B of a piezoelectric element 41 and another capacitor (C3) 39.

Gates of the FETs 31 to 34 are connected to outputs of the control unit 20 according to one-to-one correspondence, respectively.

In the two FETs 37 and 38 for the power reduction in the piezo-lens drive, a gate of the fifth FET 37 is connected to an output end of the control unit 20 connected to a gate of the first FET 31, whereas a gate of the sixth FET 38 is connected to an output end of the control unit 20 connected to a gate of the second FET 32.

The gate G0 of the first FET 31 is connected to one output end of the control unit 20 and a source of the first FET 31 is connected to a supply voltage Vcc. And, a drain (D) of the first FET 31 is connected to a drain (D) of the third FET 33.

The gate G1 of the second FET 32 is connected to the other output end of the control unit 20, a source (S) of the second FET 32 is connected to the supply voltage Vcc together with the source of the first FET 31, and a drain the second FET 32 is connected to a drain of the fourth FET 34.

The gate G2 of the third FET 33 is connected to the other output end of the control unit 20, a source of the third FET 33 is connected to a ground (GND), and a drain of the third FET 33 is connected to the drain of the first FET 31.

The gate G3 of the fourth FET 34 is connected to the other output end of the control unit 20, a source of the fourth FET 34 is connected to the ground (GND) together with the source of the third FET 33, and the drain of the fourth FET 34 is connected to the drain of the second FET 32.

A gate of the fifth FET 37 is connected to the output end of the control unit 20 connected to the gate G0 of the first FET 31. A source of the fifth FET 37 is connected to the ground together with the source of the third FET 33. And, a drain of the fifth FET 37 is connected to one end (ground side) of the charge capacitor (C1) 35.

A gate of the sixth FET 38 is connected to the output end of the control unit 20 connected to the gate G1 of the second FET 32. A source of the sixth FET 38 is connected to the ground together with the source of the fourth FET 34. And, a drain of the sixth FET 38 is connected to one end (ground side) of the charge capacitor (C2) 36.

A current charging of the charge capacitors *C1, C2) 35 and 36 in driving the piezoelectric element 41 is explained as follows.

First of all, in case of the forward piezo-lens drive, the fifth FET 37 is turned off so that the charge capacitor (C1) 35 is not charged with current.

In case of the reverse piezo-lens drive, the sixth FET 38 is turned off so that the charge capacitor (C2) 36 is not charged with current.

Hence, in case of the forward or reverse piezo-lens drive, unnecessary current charging can be prevented.

One end (A) of the piezoelectric element 41 is connected parallel to the drain connection between the first and third FETs 31 and 33, while the other end (B) of the piezoelectric element 41 is connected parallel to the drain connection between the second and fourth FETs 32 and 34.

The charge capacitor (C1) 35 is connected between one end (A) of the piezoelectric element 41 and the drain of the fifth FET 37, while the other charge capacitor (C2) 36 is connected between the other end (B) of the piezoelectric element 41 and the drain of the sixth FET 38.

Accordingly, the present invention provides the following effects or advantages.

First of all, by applying the camera lens drive using the piezoelectric element to the digital camera such as a digital camera provided to a mobile terminal and a general digital camera, a price, power consumption and equipment volume can be reduced. Since the lens for the auto-focus and zoom is driven using the H-bridge circuit together with the piezoelectric element, the power consumption required fro driving the lens can be reduced and the overall equipment volume can be minimized.

Secondly, the use of the piezoelectric element facilitates a frequency adjustment or a voltage level adjustment (current direction adjustment) for the lens drive according to the piezo-characteristics. By generating a gate voltage to be applied to the H-bridge circuit using a micro-controller, the piezoelectric element can be controlled with ease.

Thirdly, by implementing the microprocessor in charge of the control part of the lens drive to be separate from the digital signaling processor (DSP), the digital signaling processor (DSP) part enable the auto-focusing function that employs the auto-focusing algorithm.

Finally, the present invention is variously applicable to a mobile terminal, a small digital camera, a digital camcorder and the like, thereby facilitating the support of the auto-focusing and the optical zooming.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a lens in a camera, comprising:
a lens drive unit configured to move the lens in one direction according to a voltage and/or a current;
a control circuit unit configured to adjust the voltage and/or the current to move the lens; and
a control unit configured to supply a control signal for controlling the adjustment of the voltage and/or the current to the control circuit unit.

2. The apparatus of claim 1, the lens drive unit comprising a piezoelectric element configured to move the lens in either a front direction or a rear direction according to a direction of a current flowing between both ends of the piezoelectric element.

3. The apparatus of claim 1, wherein the control signal is generated for auto-focusing and optical zooming based on an input video.

4. The apparatus of claim 1, the control circuit unit comprising an H-bridge circuit configured to switch a current direction to move the lens according to the control signal.

5. The apparatus of claim 4, the H-bridge circuit comprising a plurality of field effect transistors.

6. The apparatus of claim 4, the H-bridge circuit comprising a plurality of bipolar junction transistors.

7. An apparatus for driving a lens in a camera, comprising:
a piezo-actuator having a piezoelectric element configured to drive the lens;
a micro-controller generating a voltage configured to drive the piezoelectric element; and
a control circuit configured to adjust a voltage applied to both ends of the piezoelectric element from the voltage generated from the micro-controller.

8. The apparatus of claim 7, wherein the micro-controller is configured to generate the voltage needed to drive at least one of auto-focusing and optical zooming.

9. The apparatus of claim 7, wherein the piezo-actuator is configured to drive the lens to move in either a forward direction or a reverse direction according to a direction of the voltage applied to both of the ends of the piezoelectric element.

10. The apparatus of claim 7, further comprising a digital signaling processor configured to output a lens adjustment value to the micro-controller to generate the voltage needed to drive the piezoelectric element, the digital signaling processor configured to compute the lens adjustment value based on a video inputted via the lens.

11. The apparatus of claim 7, further comprising a level shifter between the micro-controller and the control circuit, the level shifter configured to compensate for a difference between the voltage generated from the micro-controller and an operational voltage necessary for the piezoelectric element to drive the lens.

12. The apparatus of claim 7, further comprising a pull-up resistor between the micro-controller and the control circuit, the pull-up resistor configured to compensate for a difference between the voltage generated from the micro-controller and an operational voltage necessary for the piezoelectric element to drive the lens.

13. The apparatus of claim 7, the control circuit comprising a plurality of field effect transistors.

14. The apparatus of claim 13, the plurality of the field effect transistors comprising:
a first field effect transistor having a gate connected to a first output end of the micro-controller, the first field effect transistor having a source connected to a supply voltage, the first field effect transistor having a drain connected to a first end of the piezoelectric element;
a second field effect transistor having a gate connected to a second output end of the micro-controller, the second field effect transistor having a source connected to the supply voltage, the second field effect transistor having a drain connected to a second end of the piezoelectric element;
a third field effect transistor having a gate connected to a third output end of the micro-controller, the third field effect transistor having a source connected to a ground (GND), the third field effect transistor having a drain connected to the drain of the first field effect transistor and the first end of the piezoelectric element; and
a fourth field effect transistor having a gate connected to a fourth output end of the micro-controller, the fourth field effect transistor having a source connected to the ground (GND), the fourth field effect transistor having a drain connected to the drain of the second field effect transistor and the second end of the piezoelectric element.

15. The apparatus of claim 14, the control circuit further comprising:
a first charge capacitor connected between the first end of the piezoelectric element and the ground; and
a second charge capacitor connected between the second end of the piezoelectric element and the ground.

16. The apparatus of claim 15, the plurality of the field effect transistors further comprising:
a fifth field effect transistor having a gate connected to the first output end of the micro-controller, the fifth field effect transistor having a source connected to the ground, the fifth field effect transistor having a drain connected to a ground side end of the first charge capacitor; and
a sixth field effect transistor having a gate connected to the second output end of the micro-controller, the sixth field effect transistor having a source connected to the ground, the sixth field effect transistor having a drain connected to a ground side end of the second charge capacitor.

* * * * *